(12) United States Patent
Ho et al.

(10) Patent No.: US 9,888,391 B2
(45) Date of Patent: Feb. 6, 2018

(54) ULTRA-WIDEBAND ACTIVE ANTENNA PLATFORM

(71) Applicants: Jimmy Ho, Hickory, NC (US); Chengcheng Tang, Hickory, NC (US); Bryce James Eugene Worley, Rockford, IL (US); Jeffrey Sierzenga, Conover, NC (US); Jeffery Jie Liu, The Hague (NL)

(72) Inventors: Jimmy Ho, Hickory, NC (US); Chengcheng Tang, Hickory, NC (US); Bryce James Eugene Worley, Rockford, IL (US); Jeffrey Sierzenga, Conover, NC (US); Jeffery Jie Liu, The Hague (NL)

(73) Assignee: Amphenol Antenna Solutions, Inc., Rockford, IL (US)

(*) Notice: Subject to any disclaimer, the term of this patent is extended or adjusted under 35 U.S.C. 154(b) by 64 days.

(21) Appl. No.: 14/921,406

(22) Filed: Oct. 23, 2015

(65) Prior Publication Data
US 2016/0119796 A1     Apr. 28, 2016

Related U.S. Application Data

(60) Provisional application No. 62/067,523, filed on Oct. 23, 2014.

(51) Int. Cl.
| | |
|---|---|
| *H04B 1/03* | (2006.01) |
| *H04B 7/00* | (2006.01) |
| *H01Q 1/12* | (2006.01) |
| *H04W 88/08* | (2009.01) |
| *H04W 16/24* | (2009.01) |

(Continued)

(52) U.S. Cl.
CPC ............ *H04W 16/24* (2013.01); *H01Q 21/29* (2013.01); *H04B 1/40* (2013.01)

(58) Field of Classification Search
CPC ........ H04W 16/24; H04W 88/08; H04B 1/40; H04B 1/03; H04B 7/00; H01Q 21/29; H01Q 1/12; H01Q 1/42
See application file for complete search history.

(56) References Cited

U.S. PATENT DOCUMENTS

| | | | |
|---|---|---|---|
| 5,995,063 A * | 11/1999 | Somoza | H01Q 1/12 343/874 |
| 2002/0064245 A1 | 5/2002 | McCorkle | |
| 2005/0078734 A1 | 4/2005 | Baker et al. | |

(Continued)

OTHER PUBLICATIONS

International Search Report and Written Opinion issued in PCT/US15/57092 dated Jan. 8, 2016, 9 pages.

*Primary Examiner* — Blane Jackson
(74) *Attorney, Agent, or Firm* — Blank Rome LLP (57) ABSTRACT

An ultra wideband active antenna platform can be deployed globally. A plug-and-play radio unit is removably attached to an outside of the active antenna. The PAPR can be removably plugged into a docking station to provide different technology or frequency bands specific for customers in different regions without the costly replacement of the whole antenna. In addition, the heat-generating sources (power amplifiers) with heavy heatsink structures are separated from the main antenna body, so that the whole active antenna can be installed separately since the installation weight of the antenna would be reduced.

22 Claims, 10 Drawing Sheets

(51) Int. Cl.
*H01Q 21/29* (2006.01)
*H04B 1/40* (2015.01)

(56) References Cited

U.S. PATENT DOCUMENTS

| | | |
|---|---|---|
| 2005/0255878 A1 | 11/2005 | Leinonen et al. |
| 2008/0094299 A1 | 4/2008 | Williams |
| 2008/0122728 A1 | 5/2008 | Philippakis |
| 2009/0221256 A1 | 9/2009 | Sahinoglu et al. |
| 2009/0232191 A1* | 9/2009 | Gupta ................ H04L 27/2096 375/216 |
| 2009/0233644 A1* | 9/2009 | McCune, Jr. ........ H04B 1/0483 455/561 |
| 2014/0072064 A1* | 3/2014 | Lemson ........... H04B 10/25753 375/267 |
| 2015/0091777 A1* | 4/2015 | Rucki ...................... H01Q 1/42 343/872 |
| 2016/0191164 A1* | 6/2016 | Kim ................ H04B 10/25759 398/115 |
| 2016/0198523 A1* | 7/2016 | Wang ....................... H04B 1/38 455/561 |

* cited by examiner

ULTRA-WIDEBAND ACTIVE ANTENNA PLATFORM

RELATED APPLICATIONS

This application claims the benefit of U.S. Provisional Application No. 62/067,523, filed Oct. 23, 2014, the entire contents of which are incorporated herein by reference.

BACKGROUND OF THE INVENTION

Field of the Invention

This invention relates to active antenna arrays and in particular, to an ultra wideband active antenna system AAS platform with field replaceable frequency band specific components.

Background of the Related Art

FIG. 1 shows the trend in mobile wireless communication systems where more and more of the radio and base band functions are moved into the antenna. FIG. 1A shows a passive antenna connected to a Base Transmit Station BTS, and FIG. 1B shows a passive antenna 1 mounted to a tower 2 with a remote radio unit RRU 3 connected to the antenna 1 via a coaxial RF jumper cable. The RRU 3 is connected to the base station server 5 via low loss fibre optic cables 6. The RRU 3 is connected to the back of the antenna or integrated inside the antenna enclosure, as shown in FIG. 1C.

The cellular network capacity of current 3G/4G systems has been severely strained by the recent explosion in mobile data traffic due to new generations of personal mobile media devices, e.g. smart phones and tablets, etc. Active antenna systems AAS with advanced functions such as vertical sectorization and beamforming, which have been verified to exhibit significant improvement of network capacity and coverage, would lead the trend of the development of base transceiver stations BTS in wireless communication system in the future.

Figure 2:
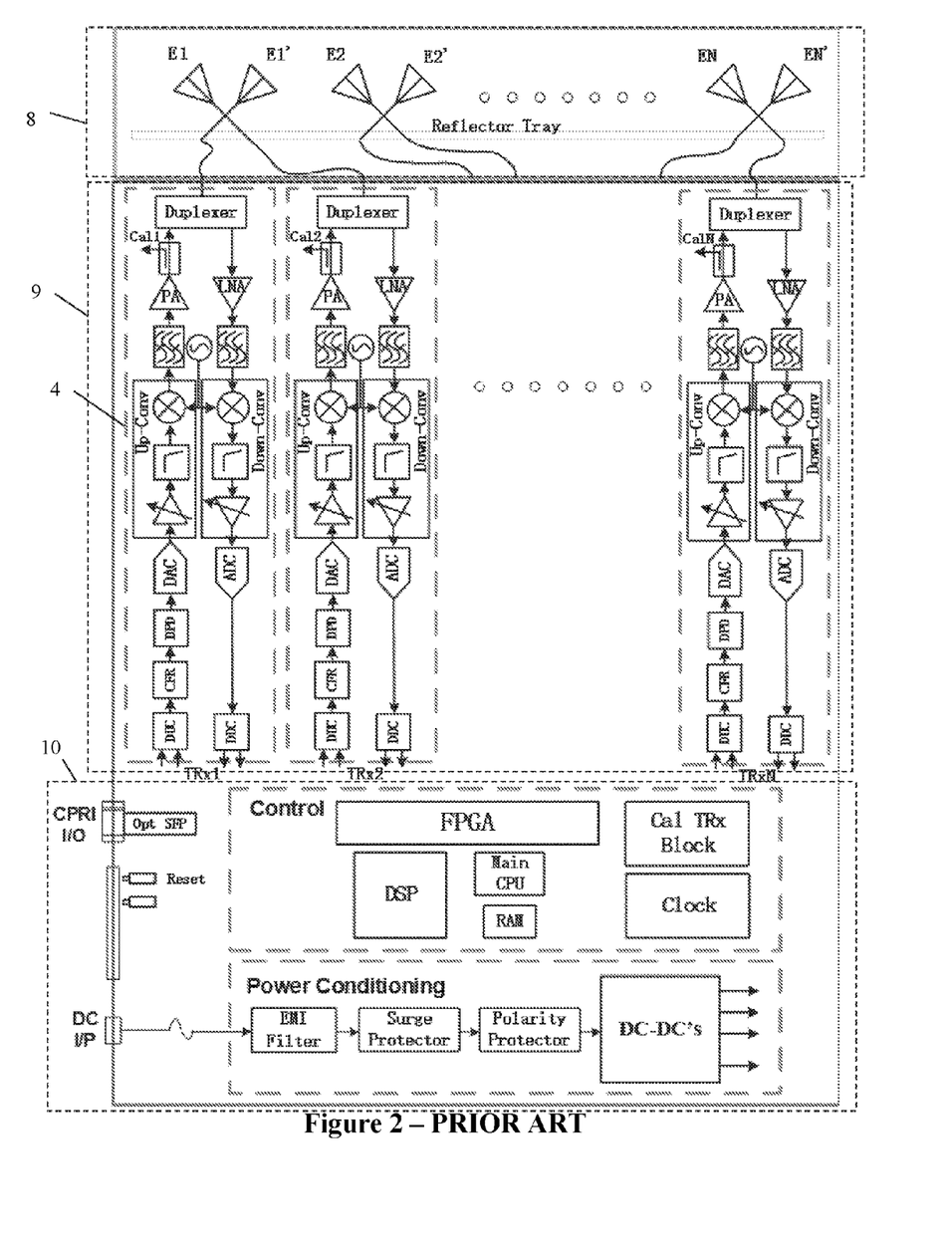
FIG. 2 is a block diagram of traditional active antenna system AAS having radiating elements, micro-radio components, and main controller core.

FIG. 2 shows a typical AAS architecture essentially having 3 layers: Antenna Layer 8, Radio Layer 9, and Main Controller Layer 10. All the components are integrated together in one package, including a matrix of small-power transceivers with the radiating elements 8 into one package and applies beamforming vectors to individual radiating element digitally. With the migration from the base station server 5 and the RRU 3 technology to AAS, the single RF part in the RRU 3 is split into a matrix of micro-radio parts 4 and each of them are integrated with a single antenna element. The micro-radio part 4 contains a duplexer, power amplifier PA, low noise amplifier (LNA) and mixer, etc.

However, there are increasing demands on extending the operating bandwidth for multi-band, multi-carrier and multi-standard wireless communication systems. The radio layer 9 includes both ultra wideband components and narrowband components, including frequency band specific analog components that can't sacrifice performance for operating bandwidth. This limits use of the AAS because the radio layer 9 has a specific narrowband micro-radio part for use with a specific frequency band. To change frequency bands of the radio layer 9 (or if the radio layer 9 fails) would require the mobile operator add a new antenna to the tower or replace the whole antenna with a new antenna having a radio layer 9 with a different frequency band. That would require the operator to configure all the connections between the various radio units 4 and the respective radiating elements 102.

Because of the need to also support legacy systems in mobile base station networks, an active-passive antenna will be the most common type of deployment. The majority of multi-band passive antennas deployed nowadays are UWB capable. That is, the low-band arrays cover 696-960 MHz and the high-band arrays covers 1695-2700 MHz. The active array is unfortunately narrowband because of narrowband or frequency specific components like the power amplifier's PA's and duplexers. Because of the heatsinks that are required to dissipate the heat from the PA's, an active-passive system can easily exceeds the 50 kg limit at which point, mobile operators will not deploy the system as it exceeds the industrial requirement for a 2 man lift. Another important factor is that the large heat generated by the PA's inside the active antenna enclosure causes the reliability issue by increasing the operating temperature and the lifespan of the electronics could be consequently reduced.

Passive InterModulation Distortion (PIM) is the unwanted signal/s generated by the mixing of 2 or more signals in a passive non-linear device. The non-linearity can be caused for instance, by dissimilar metals, dirty interconnects and loose connections. These unwanted signals can degrade the performance of the wireless communication system. The AAS shown in FIG. 2 have 3 layers (Antenna Layer, Radio Layer, Main Controller Layer) that need an interconnect solution between them. For passive antennas, soldered connections are known to provide very good and stable PIM solutions. However, soldering the different layers together using coaxial cables is very difficult due to the space available between the different layers and it is also time consuming.

Figure 1A:
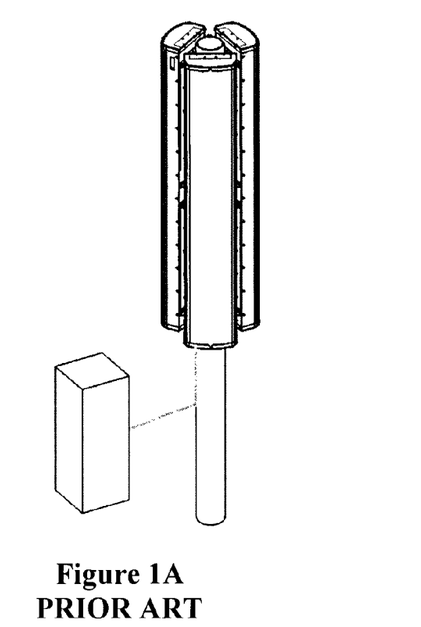
FIGS. 1A, 1B, 1C, 1D show the conventional passive and active antenna systems.
Figure 1B:
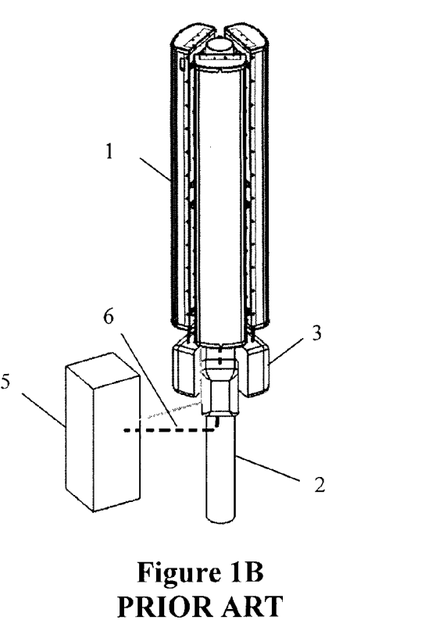
Figure 1C:
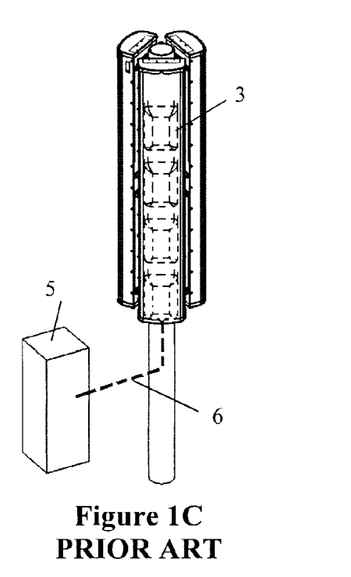
Figure 1D:
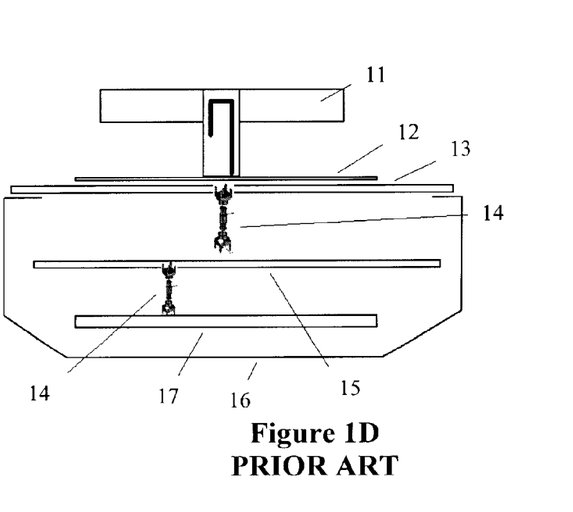

Referring to FIG. 1D, a blind-mate connection 14 can be provided between the layers, such as the board-to-board floating blind-mate interconnect solution from Amphenol RF. The interconnect 14 separates and connects the board to board connections between the different layers (i.e., the transceiver 9 board 15 is separate from but connected to the controller 10 board 17, which are both located inside the antenna housing 16 and the radiating elements 11 can be external to the housing). A ground plane 12 and feed network 13 can also be provided. But that configuration still has PIM issues.

SUMMARY OF THE INVENTION

Accordingly, it is an object of the invention to provide an active-passive antenna system that weighs less than 50 kg, that can be deployed globally with an easy modification scheme for different technology/frequency band, improve the overall reliability and reduce its installation weight compared with the traditional active antenna system. The invention addresses all the above concerns as well as minimizing another often overlooked but very important parameter and that's PIM passive intermodulation distortion. The invention includes 2 Layers: UWB Platform of Antenna-Main Controller modules and Field Replaceable platform of Narrowband PA-Duplexer modules. The active antenna is provided with a light weight UWB platform that can be deployed anywhere in the world with field replaceable frequency specific PA-Duplexer modules for providing wireless communication services to that specific region/operator.

The present invention allows the Ultra-Wideband UWB AAS platform to be deployed anywhere in the world as the AAS UWB platform comprises of an ultra wideband transceiver module and an ultra wideband antenna module. All the frequency band specific components in the radio module like the power amplifier PA modules and filters/duplexers are grouped together and plugged into a docking station for the frequency band specific for the region in which the antenna operates. This is in contrast to the current AAS platform where all the components are inside the antenna (and not field replaceable). One of the main many disadvantages of such an approach is that the power amplifiers are typically heavy and also generates a considerable amount of heat that requires some means of dissipating this heat. In addition to that, the cavity duplexers are typically of large and bulky construction to achieve the required rejection performance leading to a very heavy antenna which is difficult install on the tower.

By having a UWB AAS platform with field installed narrowband PA-Duplexer modules, we improve/address some of the biggest concern areas regarding active antennas, including: Weight, Future Proofing of Technology or Ease of Change of Technology, Passive Intermodulation Distortion PIM, and Improve Component Reliability/Lifetime.

These and other objects of the invention, as well as many of the intended advantages thereof, will become more readily apparent when reference is made to the following description, taken in conjunction with the accompanying drawings.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

Figure 3A:
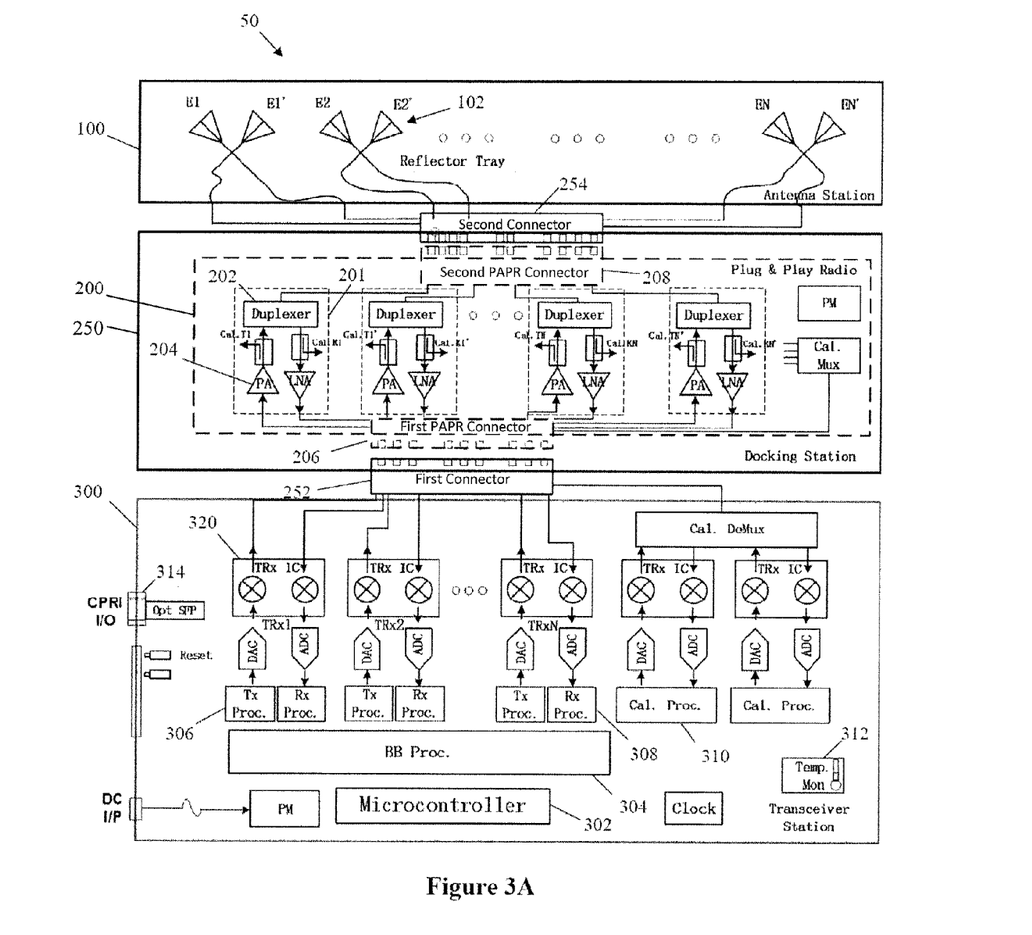
FIG. 3A is a block diagram of the active antenna system in accordance with the present invention.

Turning to the drawings, FIG. 3A shows an active antenna system AAS 50 of the present invention. The active antenna system 50 includes an antenna layer 100, a first electrical component comprising a plug-and-play radio module 200 (PAPR), and a second electrical component comprising a transceiver station or controller 300. The antenna layer 100 includes one or more radiating elements 102 for transmitting and receiving signals from and to the controller 300 via the PAPR 200.

The PAPR 200 is a frequency band specific radio unit that has a different technology/frequency band. The PAPR 200 can have various components, such as frequency band specific components, and radio units 201 that include frequency band specific duplexers 202 and power amplifiers PA 204. The PAPR 200 is a discrete device that is separate from, and removably attached to, the antenna 100 and the controller 300, so that it is field replaceable. As shown for instance, a connector assembly or docking station 250 can be provided having a first connector or connector interface 252 that removably electrically connects and mechanically couples the PAPR 200 with the controller 300 via first PAPR mating connector 206, and a second connector or connector interface 254 that removably electrically connects and mechanically couples the antenna assembly 100 with the PAPR 200 via a second PAPR mating connector 208. The connectors 206, 208, 252, 254 can be any suitable connectors, such as blindmate connectors.

One primary advantage of the micro-radio part 201 in the present AAS 50 compared with the traditional RRU 3 (FIG. 1B) is contributed by a mass of distributed, small scaled, low power consumption radio on chip RoC (the transceiver 9 of FIG. 2), whereby the RoC 9 (FIG. 2) is distributed by the present invention into the different PAPRs 200 (i.e., as the radio units 201 and the Integrated Circuit IC 320) and the present invention also provides a smaller power amplifier 204.

Thus, the PAPR 200 can be removed and a different PAPR 200 can be inserted having components that communicate over a different frequency band. In one embodiment of the invention, the PAPR 200 only contains frequency specific components to minimize the cost of replacement. However, the PAPR 200 should contain at least the power amplifier PA 204 and the duplexer 202, which are the two main frequency specific components (e.g., one PA works for 1800 MHz band and another PA works for 2600 MHz band). In one embodiment, all the power amplifiers 204 in a single PAPR 200 should operate at the same frequency band.

The controller 300 is an Ultra Wide Band UWB transceiver station which provides all the signals processing, signal transmitting and receiving functions for multiple technologies. It can have one or more processing devices, such as a microcontroller 302 or processor, as well as a baseband processor 304, Tx transmit channel processor 306, Rx receive channel processor 308.

The UWB controller 300 contains both digital and analog circuits, working as a system core. The microcontroller 302 performs an overall control of the whole system. The baseband processer 304, Tx channel processor 306 and Rx channel processer 308 implement digital signal processing including beamforming and I/Q data processing. The TRx calibration processer 310 realizes an accurate calibration with latency for both Tx and Rx signals, which is essential for beamforming realization. The temperature monitor 312 performs a real-time detection on the operating temperature of the transceiver station 300. The CPRI interface 314 is used for I/Q data transmission in baseband. There are also a matrix of ADC/DAC 316, 318 performing signal transforming from digital to analog or analog to digital domain. The UWB transceiver ICs 320 up-convert the IF signal from the DAC 318 to a low power RF signal ready to be amplified, or down-convert the received RF signal from antenna to an IF signal ready to be digitalized for data processing. Since all the transceiver ICs 320 have quite a large operating bandwidth, it's a UWB transceiver station working for different technology/frequency band.

When the controller 300 is coupled and in communication with the PAPR 200 and the antenna 100, signals can be transmitted between the controller 300 and the PAPR 200 via the first PAPR connector 206 and the first docking station connector 252, and between the PAPR 200 and the antenna 100 via the second PAPR connector 208 and the second docking station connector 254. Any of the ICs 320 can communicate with any one or more of the PAPR duplexers 202 and radiating elements 102. The communication between the antenna 100, the PAPR 200 and the controller 300 are all RF signal communication, while the microcontroller is digital control. For instance, for transmission the PAPR 200 would receive the small power beamformed RF signal from TRx ICs 320 and proceed signal amplification and filtering, then transmit the signal to the antenna radiating element 100. For receiving, the PAPR 200 would do filtering and amplification on the received RF signal from radiating element 100, and pass the pure and large enough RF signal to 300 for signal processing. Each duplexer 202 can be connected with any 102 whose operating bandwidth covers the one of 202. The Tx ports of duplexer 202 can be connected, for instance, to the PA's through an EFI or SMP connector. The EFI or SMP or a similar connector has 2 connectors where one connector is connected to the duplexer 202 and another connector which could be of the same or different construction is connected via a metal bullet which can be of varying lengths (such as about 10 mm). The PA-duplexer is enclosed in an enclosure that uses a small heatsink as there airflow all around the enclosure.

The antenna layer 100 and the controller 300 each communicate using ultra wideband frequencies, whereas the PAPR 200 communicates with narrow band frequencies (though can also hold some wide band components). Thus, various PAPRs 200 can be provided, each which communicates using a different narrow band frequency. Accordingly in one embodiment of the invention, the active antenna system 50 concentrates all of the narrow band components in the PAPR 200, so the PAPR 200 can be removed and replaced as needed to communicate with the respective antenna layer 100 for a desired narrow band frequency application. For example, a PAPR 200 that works for 1800 MHz band can be replaced by another PAPR 200 that works for 2600 MHz band if the operating frequency of this antenna needs to be changed from 1800 MHz band to 2600 MHz band. And, the controller 300 (which is located inside the antenna 100) does not include a power amplifier and includes minimal heating generating components. In addition in one embodiment, the controller 300 does not have any narrow band components. Any suitable processing components can be provided to enable the narrow band components to be separated into the PAPR 200.

Figure 3B:
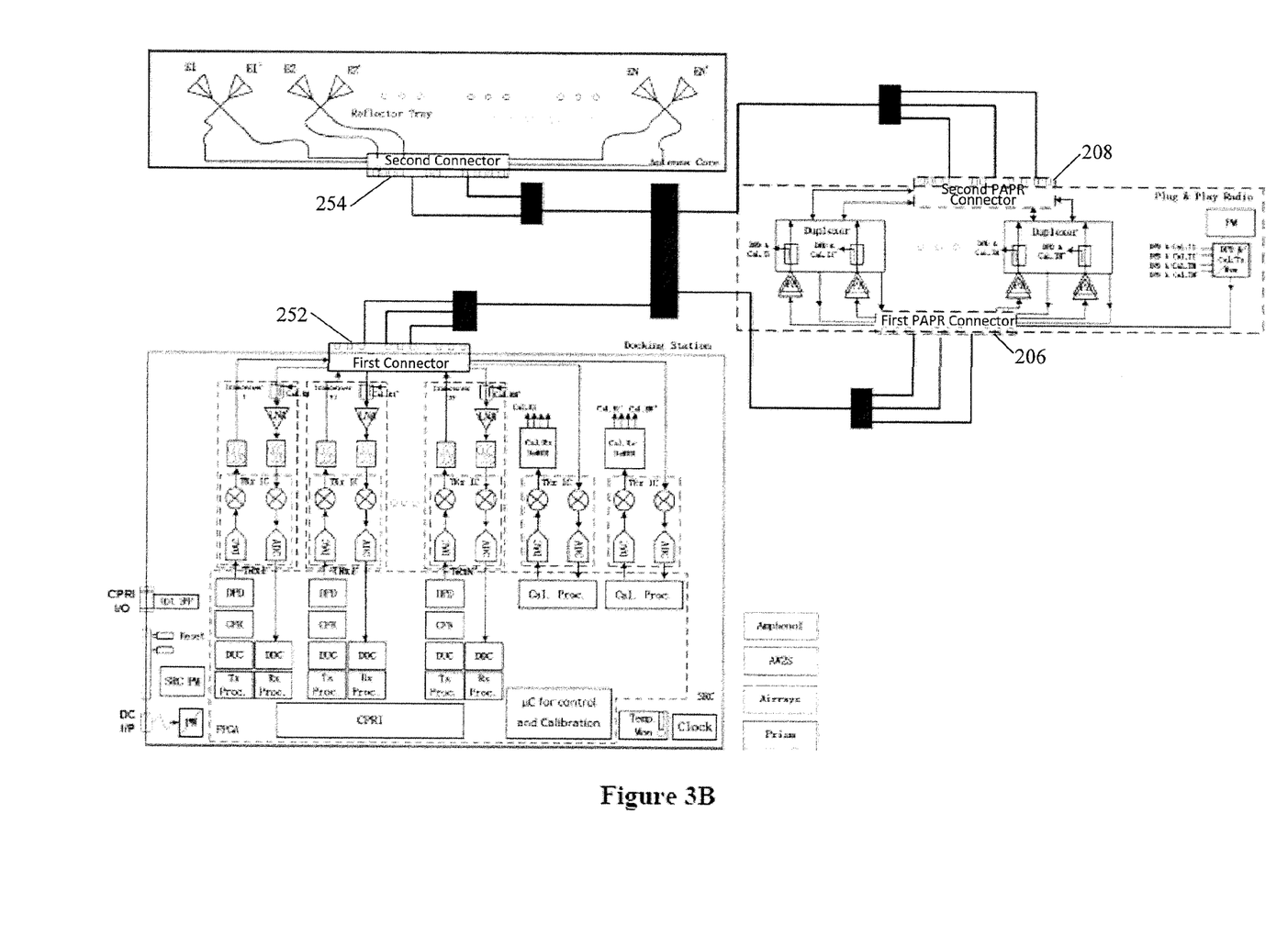
FIGS. 3B, 3C are block diagrams in accordance with alternative embodiments of the invention.
Figure 3C:
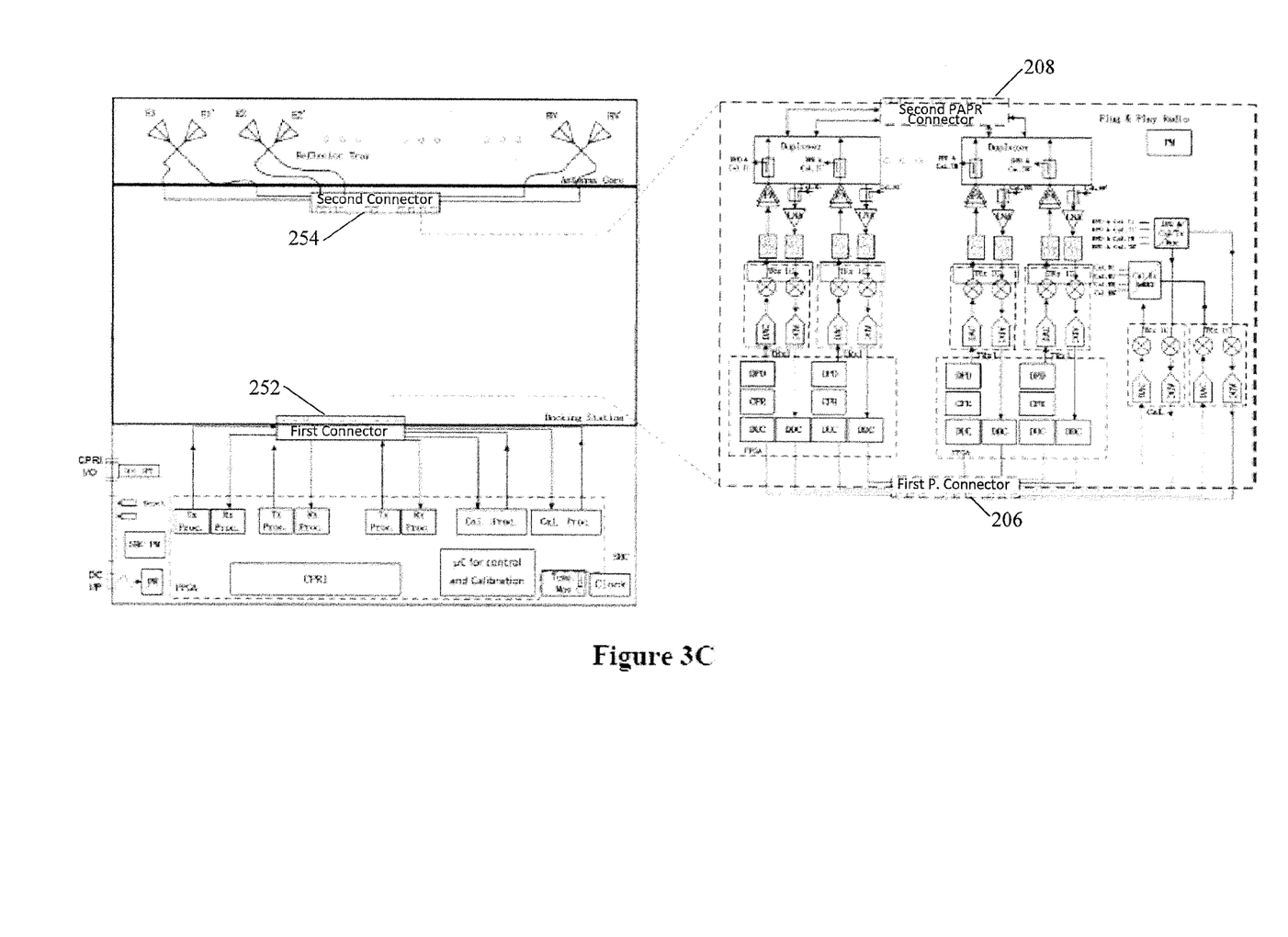

FIG. 3A is one illustrative embodiment of the components that can be provided at each of the antenna layer 100, PAPR 200 and controller 300. FIGS. 3B and 3C show other non-limiting embodiments of the invention. FIG. 3B is a block diagram of a UWB active antenna platform having an UWB AAS platform, docking station, and Plug and Play Radio PAPR unit. A LNA is part of the UWB AAS platform. FIG. 3C is a block diagram of a UWB active antenna platform in another structure having a UWB AAS platform, docking station, and Plug and Play Radio PAPR unit. An LNA and RF synthesizer are part of the PAPRs. Thus, in one embodiment of the invention, the PAPRs 200 contain all the narrow band components and the controller 300 and radiating element layer 100 have all the wide band components. Of course, other suitable configurations can be provided within the spirit and scope of the invention, and the PAPRs 200 need not only contain narrow band components and the controller and antenna layer 100 need not only contain wide band components. For instance one component can be made into either wide band or narrow band.

Figure 4A:
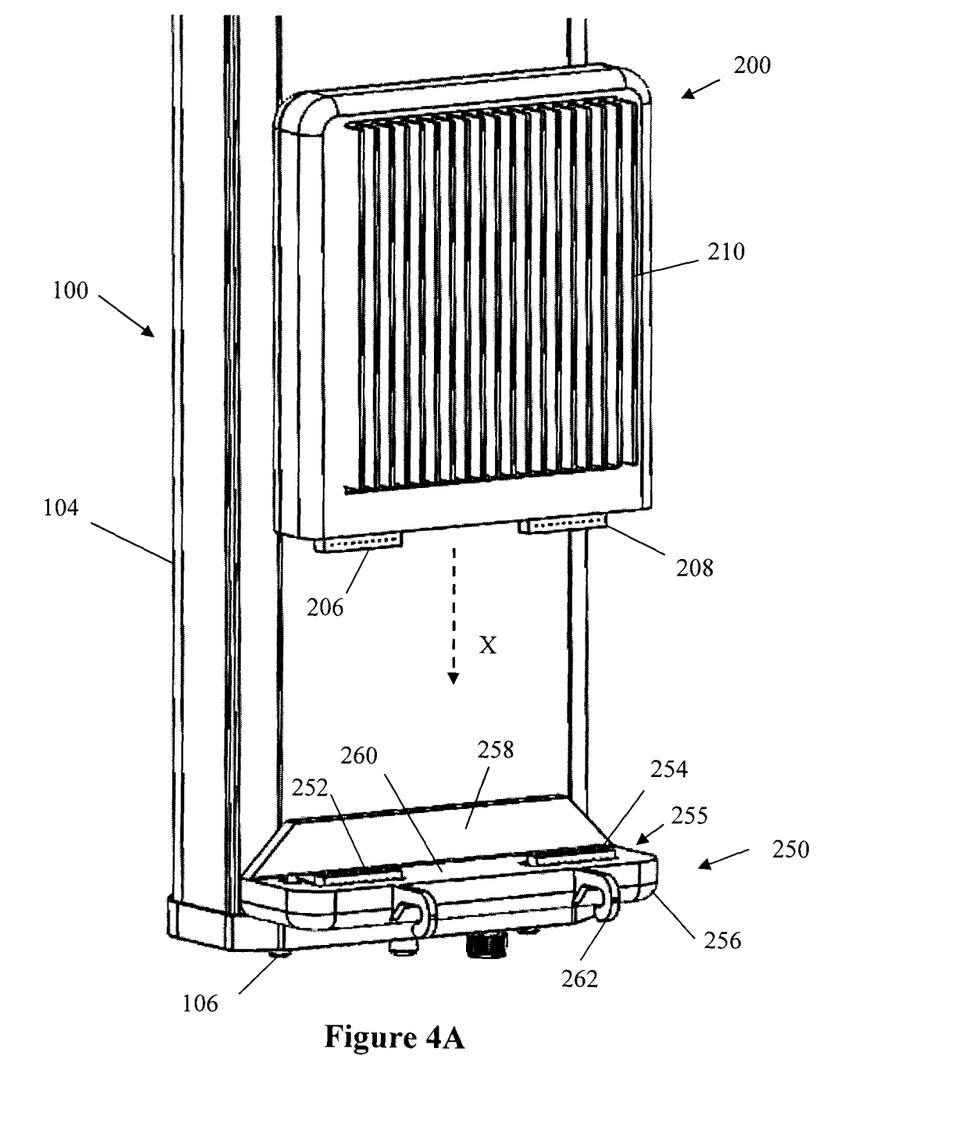
FIG. 4A shows the antenna, PAPR and docking station in a disconnected embodiment of the invention.
Figure 4B:
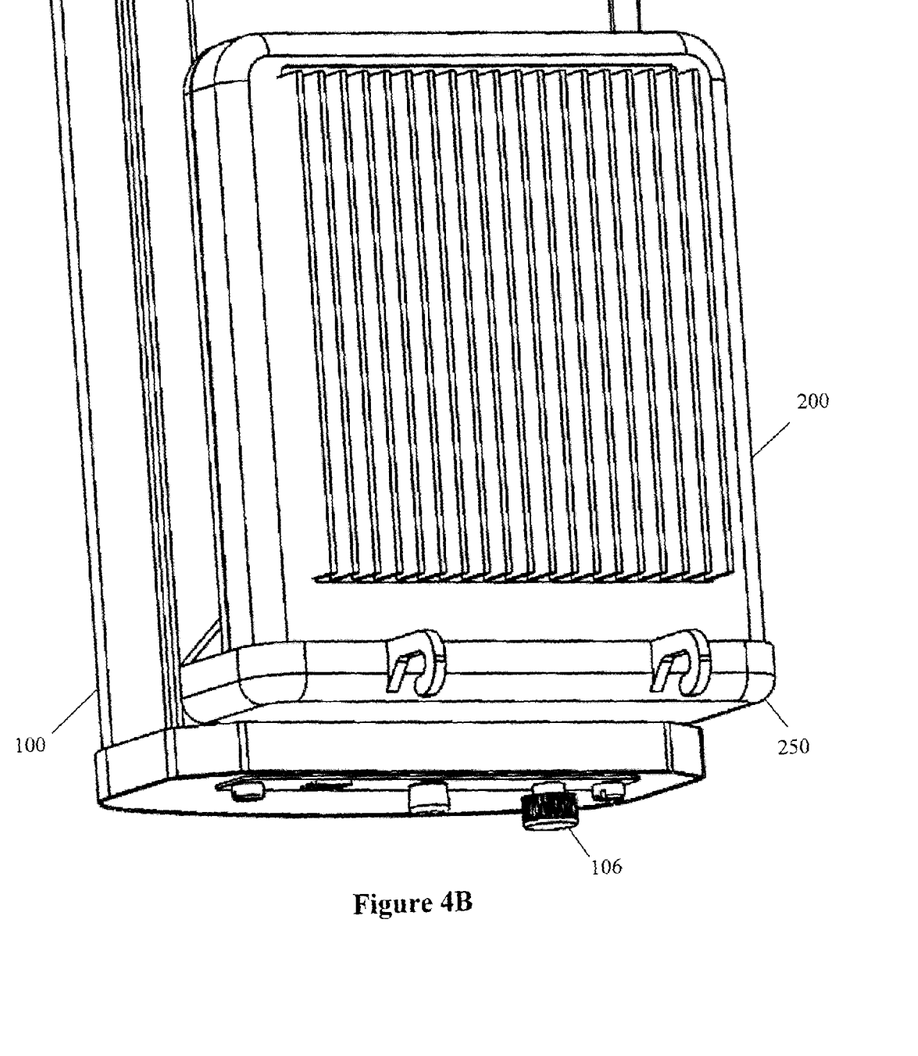
FIG. 4B shows the antenna, PAPR and docking station of FIG. 4A, but in a connected embodiment of the invention.

The antenna 100, PAPR 200 and the docking station 250 are further shown in FIGS. 4A, 4B. The antenna 100 has a housing 104 and connections or interfaces 106 to connect with other external devices, such as to receive external signals to be transmitted over the antenna 100. The controller 300 is located inside the antenna housing 104.

The PAPR 200 has a housing that contains the various components shown in FIG. 3. The housing is discrete and separate from the antenna 100 and the docking station 250, and can be any suitable shape such as rectangular. As noted above, the PA 204 and other components of the PAPR 200 generate a good deal of heat. Accordingly, fins 210 are provided on the outer surface of the housing to cool the PAPR 200. As further illustrated, the PAPR 200 is external to the antenna 100, which further assists in cooling the PA 204. Since the PA 204 is in the external PAPR 200 and not inside the antenna housing 104, the antenna 100 itself does not become heated. The first and second connectors 206, 208 are exposed and accessible at the bottom side of the housing, and preferably extend outward (downward in the embodiment shown) from the bottom side surface of the housing. Thus, the PAPR 200 can be easily and readily plugged into and removed from the docking device 250.

The docking station 250 has a housing or body 255, the first connector 206 and the second connector 208. The body 255 has a main platform 256 and a rear plate 258 extending upward to form a transverse cross-section having a general L-shape. The main platform has a top surface 260 that faces upward, and the first and second connectors 206, 208 are exposed at (and preferably extend upward from) the top surface 260 of the main platform 256. The first and second docking station connectors 252, 254 are aligned with and face the first and second PAPR connectors 206, 208. In FIG. 4A, the PAPR 200 is shown disconnected from the docking station 250. The PAPR 200 can be removably connected with the docking station 250 by the user pushing the PAPR 200 downward in the direction of the arrow X until the leading end of the PAPR housing comes to rest against the top surface 260 of the main platform 256. The rear plate 258 can guide the PAPR 200 so that the PAPR connectors 206, 208 align and mate with the docking station connectors 252, 254. The sides of the rear plate 258 can be angled to avoid abutting the PAPR 200. The docking station can have two opposing sides or side walls that further guide the PAPR to mate with the docking station. The hooks 262 can be provided extending outward from the main platform 256 and facing downward, to mount the antenna to a pole. Of course, any suitable attachment can be provided.

The docking station body 255 can be permanently coupled with the antenna housing 104, as shown, such as by screws or other fastening devices. The first docking station connector 252 is electrically connected to the antenna radiating elements 102, and the second docking station connector 254 is electrically connected to the controller 300 mounted inside the antenna housing 104. The docking station 250 can alternatively be configured to be a single integral device together with the antenna housing 104.

FIG. 4B shows the PAPR 200 fully connected with the docking station 250. In that connected configuration (as reflected in FIG. 3A), the first PAPR connector 206 is in electrical communication with the antenna 100 via the first docking station connector 252. And the second PAPR connector 208 is in electrical communication with the controller 300 located inside the antenna housing 104, via the second docking station connector 254.

Thus, the lightweight UWB docking station 250 physically connects the transceiver station 300 and the antenna station 100, with a capability for the on-site replacement of frequency band specific PAPR 200. All the wideband components are located inside the antenna housing 104, and all the frequency specific narrowband components are located inside the PAPR 200. So the user can simply remove and replace the PAPR 200 to make the antenna 100 suitable for communicating over a specific frequency band.

A first bracket or latch (not shown) can be provided on each of the antenna housing 104 and the PAPR 200 that mate with each other, and/or a second bracket or latch (not shown) can be provided on each of the PAPR 200 and the docking station 250 that also mate with each other. The first and second latching sets can stabilize the PAPR 200 on the docking station 250 and provide a reliable and sturdy connection of the connectors 206, 208, 252, 254.

Figure 5:
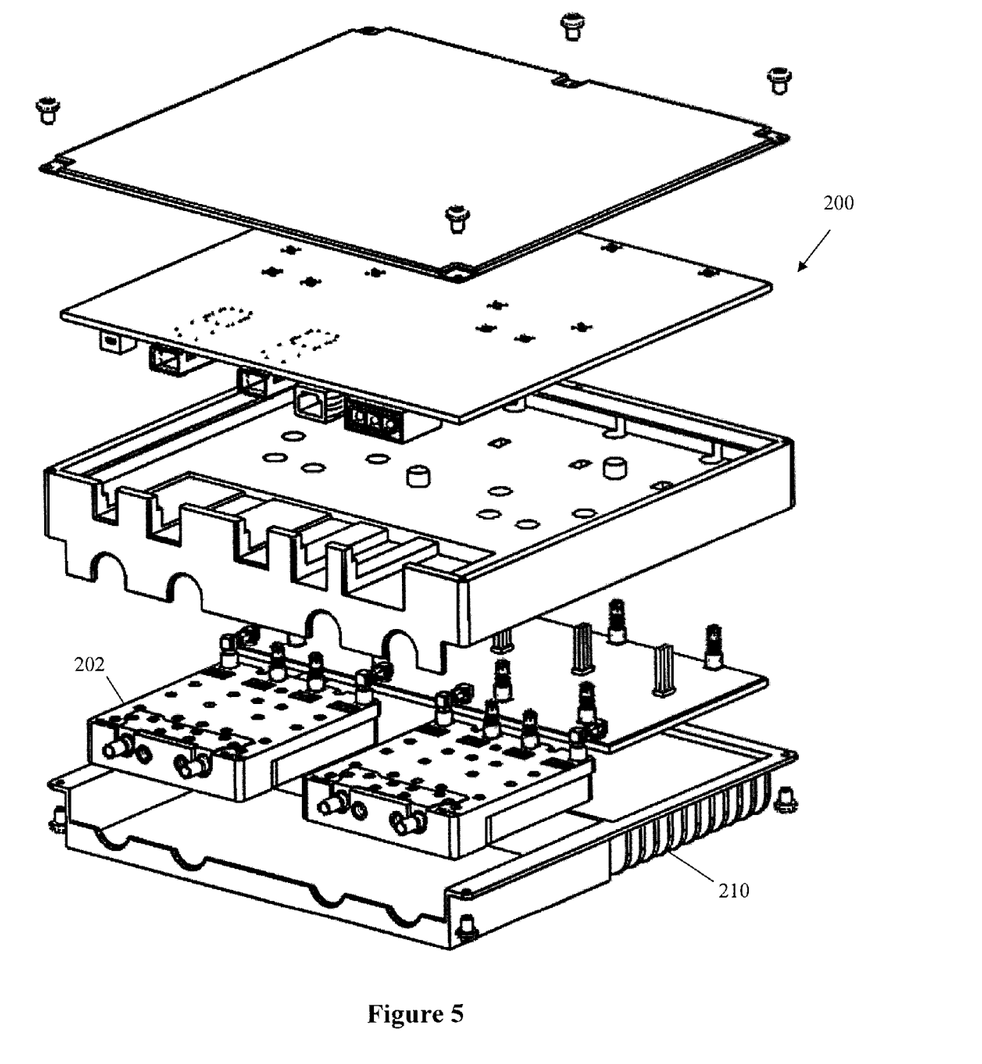
FIG. 5 is an exploded diagram of the PAPR.

Turning to FIG. 5, the PAPR 200 is shown in further detail. The PAPR 200 can have two PA's 204 and one duplexer 202 into an enclosure for one radiating element with dual-polarizations. Alternatively, multiple PA's 204 can be provided with multiple duplexers 202 in one enclosure. Here, there are four PA's 204 and two duplexers 202 for two radiating elements with dual-polarizations in one enclosure. The radiating elements can be paired, which means two PA's 204 with one duplexer 202 can serve for two radiating elements with dual-polarizations. The number of PAPRs depends on how many PA's and duplexers are provided in one PAPR, how many radiating elements are needed for a specific application, and whether or not to gauge the radiating elements. The four PA's are integrated into one PA PCB, located on top of the heatsink 210. The two duplexers are connected to the PA PCB through connectors and located close to it to minimize the loss and dimension. The body cavity is put on top of PA PCB and duplexer to provide structural support as well as shielding for each PA path on the PA PCB. With the body cavity, the interference among multiple PA paths on the PA PCB can be minimized. A control board is located on the other side of the body cavity. It has certain parts of the circuits and components for the UWB transceiver station handling the certain number of radiating elements, including but not limited to power management, daughter FPGA, LNA, TRx and Mux-DeMux system. The control board in the PAPR cavity is used for the narrow band RF components and can have different architecture, (e.g., FIGS. 3B, 3C). The other parts of the UWB transceiver station would be located in a removable main control card put in the inside the antenna, e.g. inside the bottom end cap or where else works, to apply the centralized control of the whole system in terms of calibration, beamforming and etc.

Figure 6A:
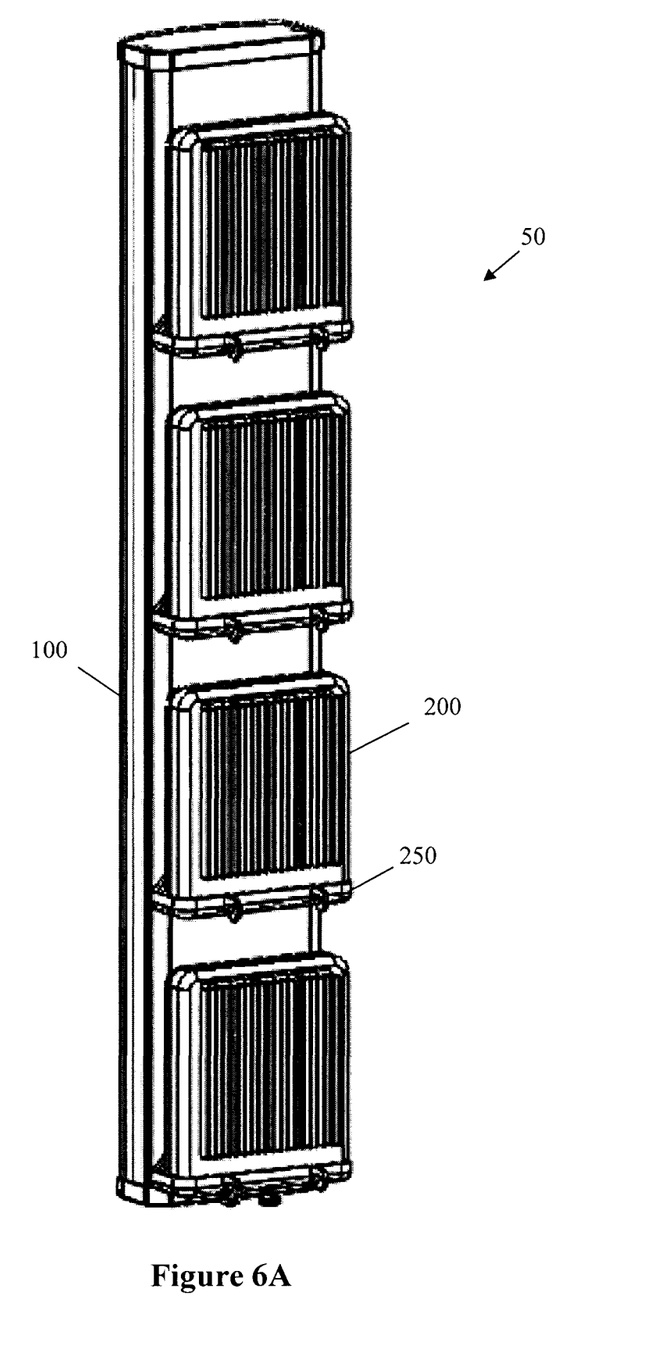
FIG. 6A shows multiple PAPRs and docking stations on a single antenna.

FIG. 6A shows an UWB AAS platform 50 with four PAPRs 200, each connected to one of four docking stations 250. The UWB platform 50 includes the broadband antenna 100, broadband docking station 250 and broadband main controller or transceiver station 300 inside the antenna 100. The antenna looks like a standard passive multi-band antenna deployed on the cellular network with very small fins to dissipate the heat from UWB transceiver circuits inside the antenna. The heat generated from the UWB transceiver circuits are small in comparison to the PA's and as such, the heatsink on the antenna chassis is small. Therefore, the antenna weighs similar to a passive antenna. The UWB AAS Platform and PAPR plug and play radio 200 may weigh more than 50 kg, but separately they weigh less than 50 kg. Therefore, it is possible to install the antenna since it is under the 50 kg requirement and can be installed without the PAPR 200 which can be fitted after the antenna has been mounted on the tower.

Figure 6B:
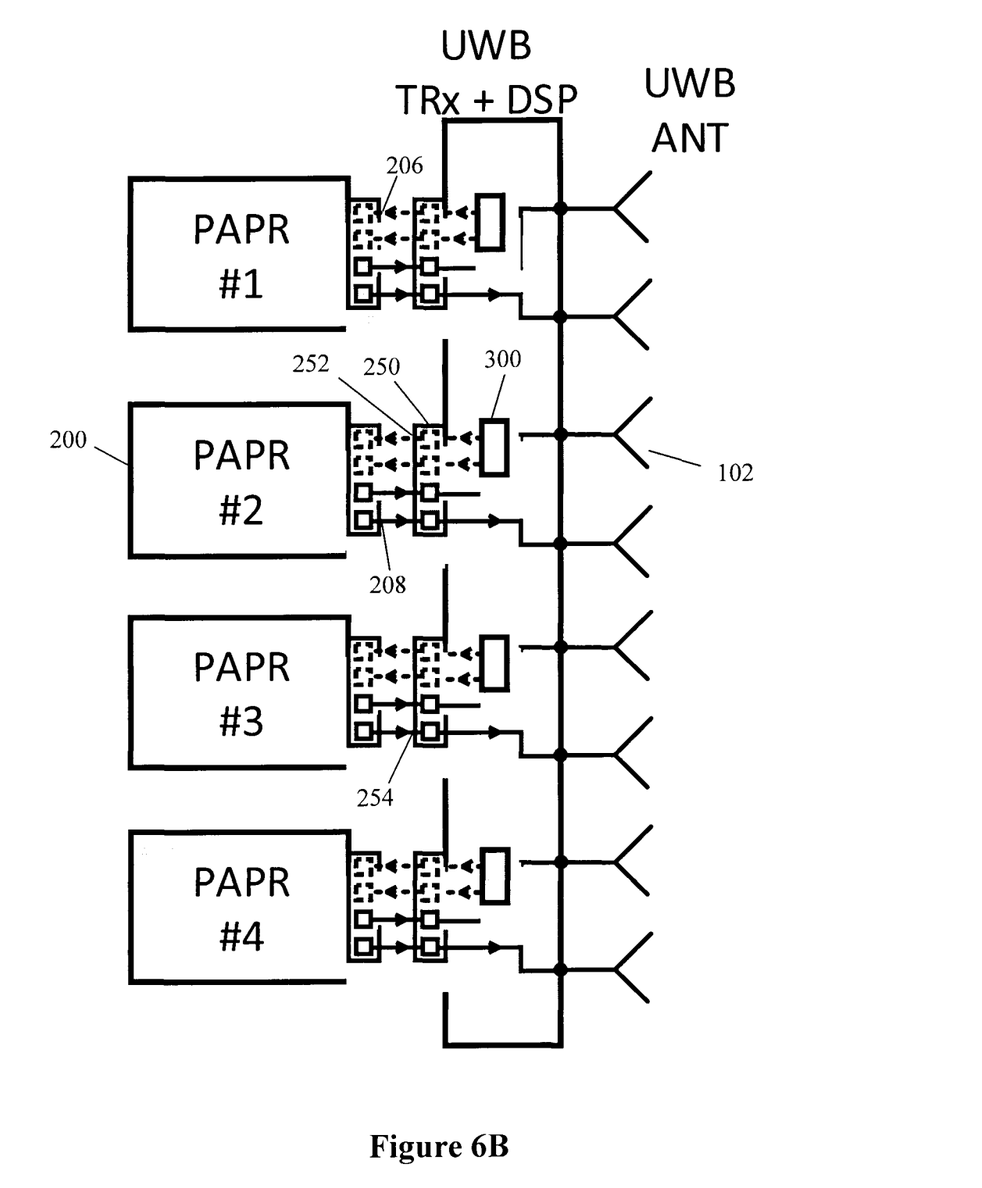
FIG. 6B is a block diagram for the antenna system of FIG. 6A.

FIG. 6B shows the connections for the four PAPRs 200 of FIG. 6A. As shown in the current embodiment, the antenna 100 contains multiple radiating elements 102 in one antenna body. All the multiple PAPRs 200 attach to the antenna body 100 through a respective docking station 250, while inside the antenna body the PAPR #1 would be connected to a first one or few radiating elements depending on different structure for specific application.

It is noted that each micro-radio unit 201 (FIG. 3A) can be connected with one radiating element 102 which requires connections between the micro-radio units 201 and the antenna body. The radio units 201 are separated into multiple PAPRs 200, which reduces the connections between each PAPR and the antenna and makes it easy to realize the connection by pre-routing the radio units 201 specific radiating element(s) 102. The PAPR 200 (and by extension the radio units 201 and the PA 204) is easy to replace. In the prior art (FIG. 2), for the radio layer 9 to be replaced, the operator has to configure connections between each of the individual radio units 4 and the respective radiating elements 102. However, in the present invention (as shown in FIG. 3A), the docking station 250 (and particularly the connector 254) establishes the connections to the respective radiating elements 102, as well as the respective ICs 320 of the controller 300. Thus, the PAPR 200 can be replaced and the connections remain in place via the docking station 250. If the radio unit 201 fails, it can be replaced by removing and replacing the PAPR 200 because the new PAPR 200 has the same connections between the radio units 201 and the connectors 206, 208 so that the radio units 201 will be connected to the respective radiating elements 102 and controller 300 and IC 320. It should be appreciated, however, that the docking station has separate utility and need not have two connectors 252, 254. For instance, a docking station can be provided that only connects radio units (such as radio units 4 or 201) to the radiating elements 102, without also connecting to the internal controller 300. In addition, the docking station need not have two separate connectors 252, 254, but rather one combined connector that couples with the radio unit 4, 201 and/or controller 300.

In addition, the PAPR 200 and the radio units 201 only need to power a few elements (1-2 elements) and does not contain all the functionality of the RRU 3 (FIG. 1, which powers and feeds the entire antenna (about 12 elements or more), including transceivers 9 (FIG. 2)).

The PAPR 200 is in an open environment allowing the airflow around the structure to cool the unit. The larger cavity duplexers and PA's which generates a lot of heat are designed to plug into the docking station 250 and these units can be designed specific for the frequency band required by the operator/region in which they operate. The UWB platform can be deployed anywhere in the world. Although there is only one PAPR 200 connected to one docking station 250 as shown in FIG. 6A, there could be multiple PAPRs with different band specific PA/duplexer components supporting different operators' requirements on the operating frequency bands. Multiple PAPRs can be connected to one or more docking stations. A main control board with a connector panel can be located at the bottom of the antenna, as shown. The main control board can have centralized control on control boards and DC power in multiple PAPRs, connection from the external BTS for beamforming data, as well as the main power DC connection for the whole antenna. Although the connector panel is located at the bottom of the antenna, this main control board doesn't have to be located there, but can be deployed anywhere it needs to be for minimizing the loss and optimizing the PIM performance. It's also replaceable after deployment if any issue happens to it.

In addition, the power amplifiers PA's are distributed, so that the power handling requirements are much lower than the RRU 3. These PA's can be made small and compact, for instance 100×50×22 mm L×W×D. Similarly, the cavity type duplexers for these applications handles lower power than a cavity duplexer used in the RRU. Cavity duplexers are typically quite large because it is constructed of metal and requires space to enable the screws to hold together the metal plates. However, filter companies have been looking to reduce the size of the cavity duplexers for active antenna applications. The size of the duplexers used in this project are typically of the order of 90×90×18 mm L×W×D. The duplexer has 2 output or common ports and 4 input ports and 2 coupled ports for calibration. The PA is used for 1 polarization on the antenna elements/s and another PA is used for the other polarization on the antenna element(s). Each PA/duplexer combination can feed 1, 2 or more elements in an array. One port can go to 1 polarization and another port can go to the other polarization of a cross polarized element to an array of 2 or more cross polarized array.

There could be more connections between the PA/duplexer and the docking station other than the connections shown in FIG. 4A. This could be the results from combing several PA-duplexer modules into one enclosure with control board embedded, or it could also be other kind of combinations.

Another advantage of the present invention is that it substantially reduces PIM issues. The PAPR 200 is a separate discrete device that is external to the antenna housing, such as being located at the back of the antenna. That configuration shields the RF signal source from the radio units 201, from the controller 300 components located inside the antenna housing. By docking the PA-Duplexers 204, 202 to the connectors 252, 254 on the docking station 250, this removes a large cause of PIM issues.

Accordingly, this invention relates to an active antenna system AAS or an active-passive antenna system that employs a lightweight mechanical docking structure having a housing, latches and low passive intermodulation PIM floating blindmate connectors for on-site field installation of/or removal of frequency band specific components such as PAs and duplexers, etc. Those frequency band specific components are encased in a small box outside the main antenna body due to their small scaled characteristic. Through use of the low PIM floating blindmate connectors, the small box consisting of frequency band specific electrical circuits is a basic plug and play unit that can be docked or removed with relative ease through a simple latch and unlatch system.

One advantage of this approach is to implement an UWB active antenna platform which can be deployed globally. For different technology or frequency band specific for customers in different regions, the PAPR 200 can be plugged into a docking station 250 without the costly replacement of the whole antenna. By separating the heat-generating source PAs 204 with a heavy heatsink structure from the main antenna body 104, the whole active antenna can be installed separately and the installation weight of the antenna would be reduced to under 50 kg, which fulfills the mobile operator requirement for a 2 man lift up a cell tower. In addition, the reliability of the active antenna is improved because the electronics' working temperature could be maintained within a standard range by moving the heat-source from the inside of the antenna to an external box.

While the invention has been described with the docking station 250, other suitable connections can be configured. For instance, the docking station shown and described in application Ser. No. 14/872,982, filed Oct. 1, 2015 (the entire content of which is hereby incorporated by reference), can be utilized.

Within this specification embodiments have been described in a way which enables a clear and concise specification to be written, but it is intended and will be appreciated that embodiments may be variously combined or separated without departing from spirit and scope of the invention. For example, it will be appreciated that all preferred features described herein are applicable to all aspects of the invention described herein.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. An active antenna system comprising:
   an antenna having an antenna housing;
   a docking station attached to the antenna housing and having a first electrical connector;
   a first electrical module having a narrow band component and a first module connector, said first module connector removably connectable to the first electrical connector; and
   a second electrical module including an ultra-wideband component and a signal processor, the second electrical module located inside the antenna housing and coupled to the first electrical connector.

2. The active antenna system of claim 1, said antenna having a plurality of radiating elements, wherein the docking station further includes a second electrical connector connected to each of the plurality of radiating elements, and wherein the first electrical module includes a second module connector removably connectable to the second electrical connector.

3. The active antenna system of claim 2, said first electrical module having a plurality of radio units connected to the first module connector and to the second module connector, wherein the plurality of radio units are connected to a respective one of the plurality of radiating elements via the second module connector and the second electrical connector when the first electrical module is connected to the docking station.

4. The active antenna system of claim 3, wherein the second electrical module includes a transceiver integrated circuit communicatively coupled to the signal processor, and wherein at least one of the plurality of radio units is connected to the transceiver integrated circuit via the first module connector and the first electrical connector when the first electrical module is connected to the docking station.

5. The active antenna system of claim 1, wherein said first electrical module comprises a plug and play module.

6. The active antenna system of claim 1, wherein said first electrical module comprises a power amplifier.

7. The active antenna system of claim 1, wherein said first electrical module comprises a duplexer.

8. The active antenna system of claim 1, wherein said first electrical module comprises a radio unit having a power amplifier and a duplexer, wherein the power amplifier and duplexer communicate on a specific narrow frequency band.

9. The active antenna system of claim 1, wherein said second electrical module does not include a power amplifier.

10. The active antenna system of claim 1, wherein said second electrical module does not include any narrow band components.

11. The active antenna system of claim 1, wherein all components in the second electrical module are ultra wide band components.

12. The active antenna system of claim 1, wherein first electrical module is frequency specific.

13. The active antenna system of claim 1, wherein all narrow band components of the active antenna system are located in the first electrical module.

14. An active antenna system comprising:
- an antenna having an antenna housing and one or more radiating elements;
- a docking station attached to an outside surface of the antenna housing and having a first electrical connector and a second electrical connector, the second electrical connector connected to said one or more radiating elements;
- a first electrical module having a frequency specific narrow band component and a heat generating component, said first electrical module further having a first module connector and a second module connector, said first electrical module located outside the antenna housing and removably connectable to said docking station to removably connect the first module connector with the first electrical connector and removably connect the second module connector with the second electrical connector; and
- a second electrical module connected to the first electrical connector and having one or more ultra wideband components and a signal processor, said second electrical module located inside the antenna housing.

15. The active antenna system of claim 14, wherein said first electrical module includes an antenna radio unit.

16. The active antenna system of claim 14, wherein said second electrical module does not include a power amplifier.

17. The active antenna system of claim 14, wherein said second electrical module does not include narrow band components.

18. The active antenna system of claim 14, wherein said first electrical module is frequency specific.

19. The active antenna system of claim 14, wherein all narrow band components of the active antenna system are located in the first electrical module.

20. The active antenna system of claim 14, further comprising:
- a third electrical module including a second frequency specific narrow band component, wherein the first electrical module is associated with a first frequency band and the third electrical module is associated with a second frequency band; and
- a second docking station attached to the outside surface of the antenna housing and configured to couple the third electrical module to the one or more radiating elements and to the second electrical module.

21. The active antenna system of claim 14, wherein the frequency specific narrow band component includes a frequency specific radio unit, and wherein the first electrical module shields a radio frequency signal source of the frequency specific radio unit from the one or more ultra wideband components of the second electrical module.

22. The active antenna system of claim 14, said first electrical module having a plurality of integrated circuits, wherein the first module connector and the first electrical connector are configured to connect the frequency specific narrow band component to one of the plurality of integrated circuits when the first electrical module is connected to the docking station.

* * * * *